(12) United States Patent
Schmid et al.

(10) Patent No.: US 8,812,167 B2
(45) Date of Patent: Aug. 19, 2014

(54) VOLT/VAR SWITCH PLAN

(75) Inventors: James Joseph Schmid, Acworth, GA (US); Hua Fan, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 13/089,782

(22) Filed: Apr. 19, 2011

(65) Prior Publication Data

US 2012/0271479 A1    Oct. 25, 2012

(51) Int. Cl.
*G05D 17/00*    (2006.01)

(52) U.S. Cl.
USPC .......................................................... 700/298

(58) Field of Classification Search
USPC .......................................................... 700/298
See application file for complete search history.

(56) References Cited

U.S. PATENT DOCUMENTS

| | | | |
|---|---|---|---|
| 4,975,855 A | | 12/1990 | Miller |
| 5,479,824 A | | 1/1996 | Torres |
| 5,570,007 A | | 10/1996 | Larsen |
| 7,729,810 B2 * | | 6/2010 | Bell et al. ...................... 700/295 |
| 2006/0238364 A1 * | | 10/2006 | Keefe et al. .................... 340/646 |
| 2007/0247216 A1 * | | 10/2007 | Kolinummi et al. ........... 327/544 |
| 2009/0265042 A1 * | | 10/2009 | Mollenkopf et al. ......... 700/298 |
| 2009/0276170 A1 | | 11/2009 | Bickel |
| 2010/0037189 A1 | | 2/2010 | Bickel |
| 2010/0114398 A1 | | 5/2010 | Feng et al. |
| 2010/0114400 A1 | | 5/2010 | Feng et al. |
| 2010/0179704 A1 | | 7/2010 | Ozog |
| 2010/0198422 A1 | | 8/2010 | Feng |
| 2011/0035073 A1 | | 2/2011 | Ozog |
| 2011/0169461 A1 * | | 7/2011 | Deaver, Sr. .................... 323/209 |
| 2011/0316338 A1 * | | 12/2011 | Peterson et al. ................ 307/29 |

OTHER PUBLICATIONS

Search Report issued in connection with EP Application No. 12164496.7, Aug. 2, 2012.

* cited by examiner

*Primary Examiner* — Sean Shechtman
(74) *Attorney, Agent, or Firm* — Armstrong Teasdale LLP

(57) ABSTRACT

A power distribution system includes at least one power distribution device and a computer coupled to the power distribution device, wherein the computer includes a memory area configured to store a hierarchy of the power distribution device. The computer is configured to adjust a first voltage level of a first power distribution device, wherein the first power distribution device is a first tier of the hierarchy, and adjust at least a second voltage level of at least a second power distribution device, wherein the second power distribution device is a second tier of the hierarchy. The computer is also configured to generate a switch plan for the power distribution device based on the adjusted first voltage level and the adjusted at least a second voltage level.

20 Claims, 2 Drawing Sheets

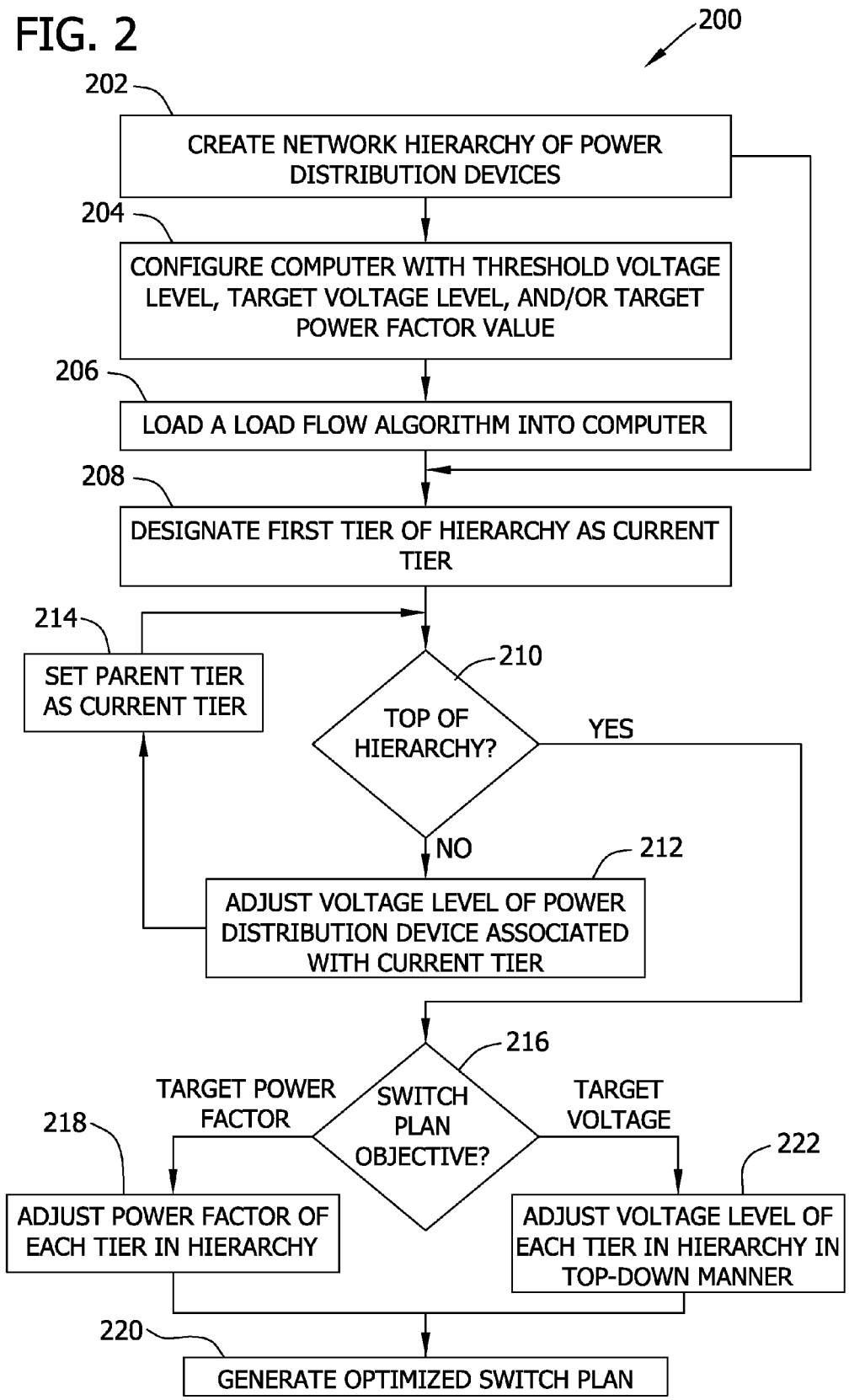

VOLT/VAR SWITCH PLAN

BACKGROUND OF THE INVENTION

The embodiments described herein relate generally to power distribution systems and, more particularly, to systems and methods for improving the performance of a power distribution system.

At least some known power distribution systems use reactive compensation to reduce unnecessary current flow. Reducing unnecessary current flow reduces energy losses within the system. For example, at least some known power distribution systems use voltage regulation algorithms to adjust the effective loading of a feeder circuit based on the voltage dependence characteristics of a load on the feeder circuit. Adjusting the effective loading can thus reduce the energy losses.

One known voltage regulation algorithm is a voltage and var algorithm that attempts to improve the distribution of voltages and currents within a power distribution system. Such an algorithm enhances system efficiency by minimizing energy losses and/or minimizing energy demand. For example, such an algorithm enhances energy delivery by controlling voltage regulators and/or reactive power resources using system models and/or demand forecasts.

At least some known voltage regulation algorithms use a trial-and-error methodology to determine a switch plan that provides the desired efficiencies. For example, at least some known voltage regulation algorithms set a voltage level of voltage regulators in the system based on the voltage level of capacitor banks in the system. At least some voltage regulation algorithms also activate and deactivate the capacitor banks in different portions of the system, analyze power flow through the system with the varying capacitor bank activations, and/or examine the efficiency of the power delivery. If the desired efficiency is not achieved, the settings may be modified and the algorithm may be re-executed. However, such trial-and-error methods are generally time consuming. Moreover, using such an algorithm, the system may be delivering power using inefficient settings during this analysis, which leads to energy losses and accompanying revenue losses.

BRIEF DESCRIPTION OF THE INVENTION

In one aspect, a power distribution system includes at least one power distribution device and a computer coupled to the power distribution device, wherein the computer includes a memory area configured to store a hierarchy of the power distribution device. The computer is configured to adjust a first voltage level of a first power distribution device, wherein the first power distribution device is a first tier of the hierarchy, and adjust at least a second voltage level of at least a second power distribution device, wherein the second power distribution device is a second tier of the hierarchy. The computer is also configured to generate a switch plan for the power distribution device based on the adjusted first voltage level and the adjusted at least a second voltage level.

In another aspect, a computer is provided for use with a power distribution system. The computer is communicatively coupled to at least one power distribution device and includes a memory area configured to store a threshold voltage level and a hierarchy of the power distribution device. The computer also includes a processor coupled to the memory area and configured to adjust a first voltage level of a first power distribution device based on the threshold voltage level, wherein the first power distribution device is a first tier of the hierarchy, and adjust at least a second voltage level of at least a second power distribution device based on the threshold voltage level, wherein the second power distribution device is a second tier of the hierarchy. The processor is also configured to generate a switch plan for the power distribution device based on the adjusted first voltage level and the adjusted at least a second voltage level.

In another aspect, a method includes configuring a computer with a hierarchy including a plurality of electrical system components each having at least one power distribution device, and storing the hierarchy in a memory area. For a first tier of the hierarchy, a first voltage level of a first power distribution device is adjusted, and for at least a second tier of the hierarchy, a second voltage level of a second power distribution device is adjusted. A switch plan is generated for the electrical system components based on the adjusted first voltage level and the adjusted at least a second voltage level.

BRIEF DESCRIPTION OF THE DRAWINGS

FIG. 2 is a flowchart of an exemplary method that may be used to determine a switch plan for use by the power distribution system shown in FIG. 1.

DETAILED DESCRIPTION OF THE INVENTION

Figure 1:
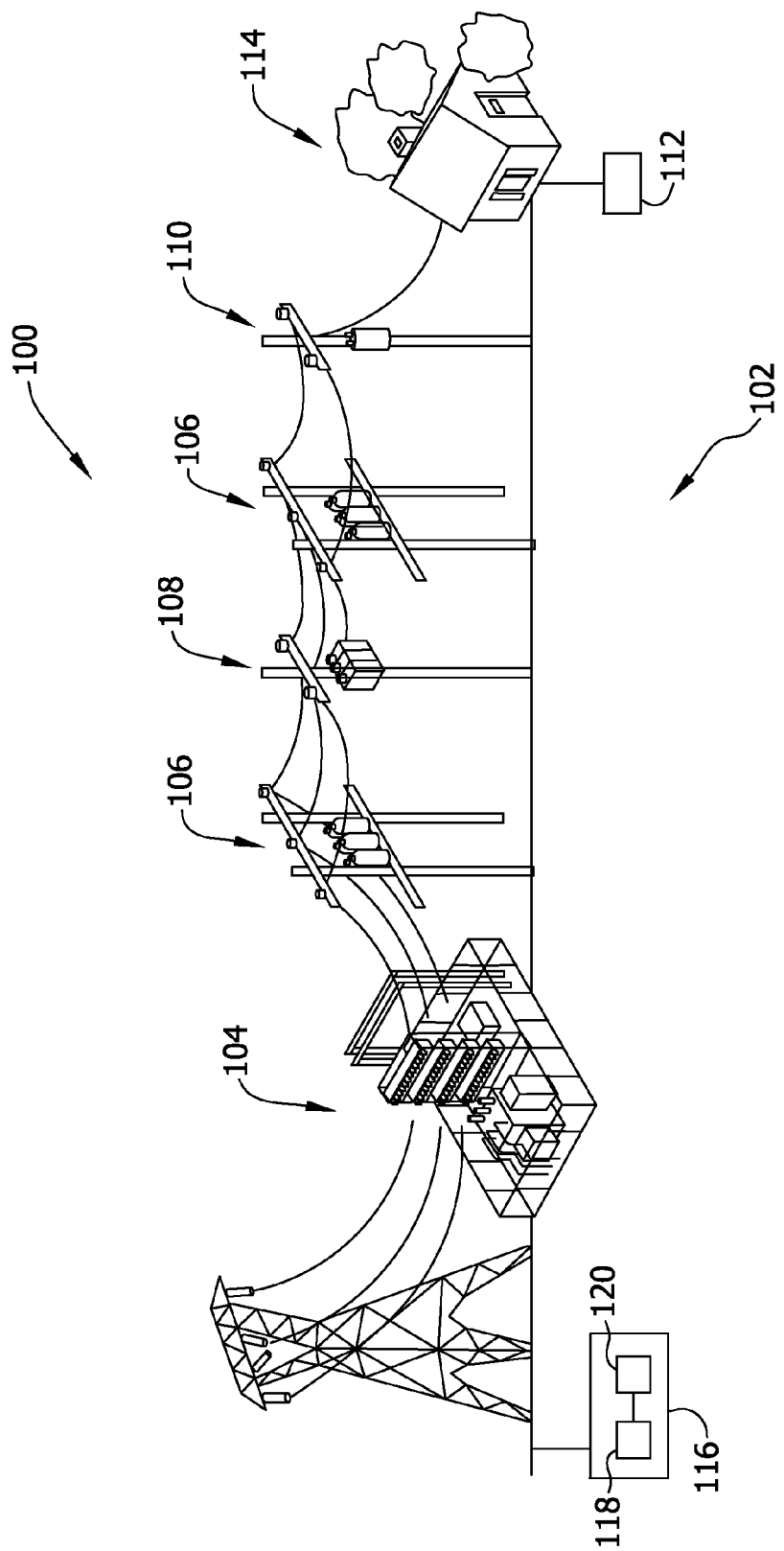
FIG. 1 is a schematic diagram of an exemplary power distribution system.

Exemplary embodiments of systems and methods for determining a switch plan for use by a power distribution system are described herein. The embodiments described herein enable at least one power distribution device to be evaluated and controlled to maintain target voltage levels and/or a power factor of each power distribution device within the system. Moreover, continuously monitoring the voltage levels and/or power factors of power distribution devices facilitates flattening the overall voltage profile for the system, and thus reduces the average operating voltage of the power distribution devices. Furthermore, flattening the voltage profile and/or reducing the average operating voltage facilitates enhanced energy savings through greater efficiency in transmitting electricity to loads.

Exemplary technical effects of systems, methods, and apparatus described herein include at least one of: (a) configuring a computer with a hierarchy including a plurality of power distribution devices, and storing the hierarchy in a memory area; (b) for each tier of the hierarchy, adjusting a respective voltage level of one or more related power distribution devices; and (c) generating a switch plan for the power distribution devices based on the adjusted voltage levels.

FIG. 1 is a schematic diagram of an exemplary power distribution system 100. In the exemplary embodiment, system 100 includes a plurality of power distribution devices 102. Exemplary power distribution devices 102 may include, for example, a substation load tap changer or voltage regulator 104, a line voltage regulator 106, a capacitor bank control 108, a single-phase or multiple-phase transformer 110, and/or a customer meter 112 coupled to a load 114, such as a customer's home. Voltage regulators 104 and 106 and capacitor bank controls 108 each operate at a designated voltage level and/or with a designated power factor.

Moreover, in the exemplary embodiment, system 100 includes a computer or controller 116 that is coupled to power distribution devices 102 via a network (not shown). Computer 116 includes at least one processor 118, such as a microprocessor, a microcontroller-based platform, a suitable integrated circuit or one or more application-specific integrated circuits (ASICs). Processor 118 is communicably coupled with, or is operable to access or to exchange signals with, at least one data storage or memory area 120. Memory area 120 may include one, or more than one, forms of memory. For example, memory area 120 can include random access memory (RAM), which can include non-volatile RAM (NVRAM), magnetic RAM (MRAM), ferroelectric RAM (FeRAM) and other forms of memory. Memory area 120 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 120. Memory area 120 may also be, or may include, a detachable or removable memory, including, but not limited to, a suitable cartridge, disk, compact disk read only memory (CD ROM), digital versatile disk (DVD) or universal serial bus (USB) memory.

In the exemplary embodiment, memory area 120 stores measured voltage levels of power distribution devices 102, threshold voltage level data for power distribution devices 102, and/or threshold power factor values for power distribution devices 102. Moreover, memory area 120 stores a network hierarchy of power distribution devices 102. For example, the hierarchy can be organized in a tree form with a plurality of tiers that are each associated with a respective power distribution device 102. For example, a first tier of the hierarchy is associated with voltage regulator 106 and a second tier of the hierarchy is associated with a capacitor bank control 108. The hierarchy may be organized in any suitable manner. For example, the tiers may be organized based on a distance from the utility or a distance from computer 116, such that a first tier is associated with customer meter 112, and a second tier is associated with phase transformer 110 that is geographically and/or communicatively located closer to computer 116. Because phase transformer 110 is located closer to computer 116, such as before electrical lines connecting phase transformer 110 to multiple loads 114 are split to serve a plurality of loads 114, phase transformer 110 receives a greater portion of the total energy output from the utility and, thus, has a higher voltage level. Similarly, a third tier is associated with line voltage regulator 106, which is located closer to computer 116 and, thus, receives a greater portion of the total energy output from the utility as compared to phase transformer 110. In an alternative embodiment, the hierarchy is organized in the reverse manner, wherein the node closest to computer 116, such as substation load tap changer or voltage regulator 104 is associated with the first tier. Alternatively, the hierarchy can be organized in any suitable manner that enables computer 116 to determine a switch plan for system 100, as described in greater detail below.

In the exemplary embodiment, computer 116 analyzes voltage levels of power distribution devices 102 to determine a switch plan for use by system 100. The switch plan may be based on a desired voltage level of each power distribution device 102 and/or a desired power factor. Moreover, computer 116 evaluates and controls power distribution devices 102 to maintain target voltage levels and/or a power factor of each power distribution device 102 within system 100. Continuously monitoring the voltage levels and/or power factors of power distribution devices 102 enables computer 116 to level off or flatten the overall voltage profile for system 100, which lowers the average operating voltage of power distribution devices 102. This can result is significant energy savings through greater efficiency in transmitting electricity to loads 114.

FIG. 2 is a flowchart 200 that illustrates an exemplary method that may be used for determining a switch plan for use by a power distribution system 100 (shown in FIG. 1). In the exemplary embodiment, computer 116 (shown in FIG. 1) creates 202 a network hierarchy of power distribution devices 102 (shown in FIG. 1) within system 100. For example, computer 116 may automatically create the hierarchy by sensing a distance of each power distribution device 102 from computer 116. Alternatively, an operator may configure computer 116 with the hierarchy. In the exemplary embodiment, the hierarchy is stored in memory area 120 (shown in FIG. 1). Moreover, computer 116 is configured 204 with a threshold voltage level, a target voltage level, and/or a target power factor value for each tier in the hierarchy. The threshold voltage levels and/or threshold power factor values are stored in memory area 120 in association with a respective tier and/or in association with one or more power distribution device 102 that is represented by a tier.

In the exemplary embodiment, a load flow algorithm is loaded 206 for execution by computer 116. For example, the load flow algorithm is stored in memory area 120 for execution by processor 118 (shown in FIG. 1), and includes one or more computer-executable components for generating a switch plan for system 100. Computer 116 may load and execute the load flow algorithm periodically. Alternatively, computer 116 may load and execute the load flow algorithm in response to a command from an operator. Moreover, computer 116 may load the load flow algorithm only once and execute the load flow algorithm continuously. In the exemplary embodiment, the load flow algorithm causes computer 116 to designate 208 a first tier of the hierarchy as a current tier. In the exemplary embodiment, the first tier of the hierarchy is the bottom tier, such as customer meter 112 (shown in FIG. 1). However, the first tier may be any level of the hierarchy at which the operator wishes to begin the load flow algorithm. In the exemplary embodiment, computer 116 determines 210 whether the current tier is the final tier or top tier of the hierarchy. When computer 116 determines that the current tier is not the final tier, such as during analysis of the first tier, computer 116 adjusts 212 the voltage level of each power distribution device 102. For example, computer 116 transmits a signal via a network power distribution device 102 associated with the current tier, which causes power distribution device 102 to adjust the voltage level. Computer 116 then compares the adjusted voltage level to the threshold voltage level for the applicable tier to ensure that the adjusted voltage level is within a range associated with the threshold voltage level.

In the exemplary embodiment, computer 116 designates 214 a second tier of the hierarchy as a current tier. The second tier is the parent tier of the first tier when hierarchy is shown in a leaf-and-branch hierarchy. Computer 116 then determines 210 whether the current tier is the final tier, or top tier, of the hierarchy, and adjusts 212 the voltage level of power distribution device 102 associated with the current tier. Computer 116 repeats the above steps until computer 116 determines 210 that the current tier is the final tier, or top tier, of the hierarchy.

In the exemplary embodiment, after computer 116 determines 210 that the current tier is the final tier of the hierarchy, and after computer 116 adjusts 212 the voltage level of power distribution device 102 associated with the final tier, computer 116 determines 216 a switch plan objective. If the switch plan objective is a target power factor value, computer 116 adjusts 218 a respective power factor value of each power distribution device 102 based on the threshold power factor value stored in memory area 120. For example, computer 116 adjusts the power factor value of each tier in the hierarchy, starting from the final tier, or top tier, of the hierarchy and ending with the first tier, or bottom tier, of the hierarchy. To adjust the power factor value, computer 116 may activate or deactivate capacitor banks within each power distribution device 102 or located near each power distribution device 102 until the power factor value is within a range associated with the target power factor value. Computer 116 then generates 220 the switch plan based on the adjusted power factor values.

However, if the switch plan objective is a target voltage level, computer 116 adjusts 222 a respective power factor value of each power distribution device 102 based on the threshold power factor value stored in memory area 120. For example, computer 116 adjusts the voltage level of each tier in the hierarchy, starting from the final tier, or top tier, of the hierarchy and ending with the first tier, or bottom tier, of the hierarchy until the voltage level is within a range associated with the target voltage level. Computer 116 then generates 220 the switch plan based on the adjusted voltage levels.

Exemplary embodiments of systems, methods, and apparatus for determining a switch plan for use by a power distribution system are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer or controller, such as those described herein, includes at least one processor or processing unit and a system memory. The computer or controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary power distribution system environment, embodiments of the invention are operational with numerous other general purpose or special purpose power distribution system environments or configurations. The power distribution system environment is not intended to suggest any limitation as to the scope of use or functionality of any aspect of the invention. Moreover, the power distribution system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power distribution system of a utility, said power distribution system comprising:
    at least two power distribution devices; and
    a computer coupled to said at least two power distribution devices, said computer comprising a memory area, said computer configured to:
        create and store, in said memory area, a hierarchy of said at least two power distribution devices, wherein the hierarchy includes a first tier associated with a first distance from the utility, and a second tier associated with a second distance from the utility, wherein the first distance is different than the second distance;
        adjust a first voltage level of a first power distribution device of said at least two power distribution devices, wherein said first power distribution device is associated with the first tier of the hierarchy;
        adjust at least a second voltage level of at least a second power distribution device of said at least two power distribution devices, wherein said second power distribution device is associated with the second tier of the hierarchy, and wherein said computer is configured to adjust the first voltage level and the at least a second voltage level on a tier by tier basis such that the first voltage level is adjusted before the at least a second voltage level is adjusted; and
        generate a switch plan for said at least two power distribution devices based on the adjusted first voltage level and the adjusted at least a second voltage level.

2. A power distribution system in accordance with claim 1, wherein said memory area is further configured to store a threshold voltage level associated with each tier of the hierarchy.

3. A power distribution system in accordance with claim 2, wherein said computer is further configured to compare the adjusted first voltage level to the threshold voltage level associated with the first tier of the hierarchy.

4. A power distribution system in accordance with claim 2, wherein said computer is further configured to compare the adjusted at least a second voltage level to the threshold level associated with the second tier of the hierarchy.

5. A power distribution system in accordance with claim 1, wherein said computer is further configured to determine a switch plan objective.

6. A power distribution system in accordance with claim 5, wherein when the switch plan objective is a target power factor, said memory area is further configured to store a threshold power factor value associated with each tier of the hierarchy, and said computer is further configured to adjust a respective power factor value of each of said at least two power distribution devices based on the threshold power factor value associated with the respective tier of the hierarchy.

7. A power distribution system in accordance with claim 6, wherein said computer is configured to generate the switch plan based on the adjusted power factor values.

8. A power distribution system in accordance with claim 5, wherein when the switch plan objective is a target voltage level, said memory area is configured to store a threshold voltage level for each tier of the hierarchy, and said computer is further configured to adjust the respective voltage level of each of said at least two power distribution devices based on the respective threshold voltage level beginning with said second power distribution device and ending with said first power distribution device.

9. A computer for use with a power distribution system of a utility, said computer communicatively coupled to at least two power distribution devices, said computer comprising:
  a memory area configured to store a threshold voltage level and a target voltage level for each tier of a hierarchy of said at least two power distribution devices; and
  a processor coupled to said memory area and configured to:
    create and store, in said memory area, the hierarchy of said at least two power distribution devices, wherein the hierarchy includes a first tier associated with a first distance from the utility and a second tier associated with a second distance from the utility, wherein the first distance is different than the second distance;
    adjust a first voltage level of a first power distribution device of the at least two power distribution devices associated with the first tier of the hierarchy to a first target voltage level associated with the first tier of the hierarchy as constrained by the first threshold voltage level associated with the first tier of the hierarchy;
    adjust at least a second voltage level of at least a second power distribution device of the at least two power distribution devices associated with the second tier of the hierarchy to a second target voltage level associated with the second tier of the hierarchy as constrained by the second threshold voltage level associated with the second tier of the hierarchy, wherein said processor is configured to adjust the first voltage level and the at least a second voltage level on a tier by tier basis such that the first voltage level is adjusted before the at least a second voltage level is adjusted; and
    generate a switch plan for the at least two power distribution devices based on the adjusted first voltage level and the adjusted at least a second voltage level.

10. A computer in accordance with claim 9, wherein said computer is further configured to compare the adjusted first voltage level to the first threshold voltage level.

11. A computer in accordance with claim 9, wherein said computer is further configured to compare the adjusted at least a second voltage level to at least the second threshold voltage level.

12. A computer in accordance with claim 9, wherein said processor is further configured to determine a switch plan objective.

13. A computer in accordance with claim 12, wherein when the switch plan objective is a target power factor, said memory area is further configured to store a threshold power factor value, and said processor is further configured to adjust a respective power factor value of each of the at least two power distribution devices based on the threshold power factor value.

14. A computer in accordance with claim 13, wherein said processor is configured to generate the switch plan based on the adjusted power factor values.

15. A computer in accordance with claim 12, wherein when the switch plan objective is a target switch plan voltage level, said computer is further configured to adjust the respective voltage level of each of the at least two power distribution devices based on the respective threshold voltage level associated with each tier of the hierarchy beginning with the second power distribution device and ending with the first power distribution device.

16. A method comprising:
  creating, by a computer including a memory area, a hierarchy including at least two power distribution devices, wherein the hierarchy includes a first tier associated with a first distance from a utility and a second tier associated with a second distance from the utility, wherein the first distance is different than the second distance, and storing the hierarchy in the memory area;
  for the first tier of the hierarchy, adjusting a first voltage level of a first power distribution device of the at least two power distribution devices, wherein the first power distribution device is associated with the first tier of the hierarchy;
  for at least a second tier of the hierarchy, adjusting a second voltage level of a second power distribution device of the at least two power distribution devices, wherein the second power distribution device is associated with the second tier of the hierarchy, and wherein the first voltage level and the at least a second voltage level are adjusted on a tier by tier basis such that the first voltage level is adjusted before the at least a second voltage level is adjusted; and
  generating a switch plan for the at least two power distribution devices based on the adjusted first voltage level and the adjusted at least a second voltage level.

17. A method in accordance with claim 16, further comprising:
  configuring the computer with a threshold voltage level for each tier of the hierarchy;
  adjusting a first voltage level comprises comparing the adjusted first voltage level to the first threshold voltage level associated with the first tier of the hierarchy; and
  adjusting a second voltage level comprises comparing the adjusted at least a second voltage level to the second threshold voltage level associated with the second tier of the hierarchy.

18. A method in accordance with claim 16, further comprising determining a switch plan objective.

19. A method in accordance with claim 18, wherein when the switch plan objective is a target power factor, said method further comprises:

configuring the computer with a threshold power factor value;

adjust a respective power factor value of each of the at least two power distribution devices based on the threshold power factor value; and generating the switch plan based on the adjusted power factor values.

20. A method in accordance with claim 18, wherein when the switch plan objective is a target voltage level, said method further comprises:

configuring the computer with a threshold voltage level for each tier of the hierarchy;

adjusting the respective voltage level of each of the at least two power distribution devices based on the respective threshold voltage level beginning with the second power distribution device and ending with the first power distribution device; and generating the switch plan based on the adjusted voltage levels.

* * * * *